March 25, 1969   R. SOBOTTA   3,434,360
SLIDE CHANGER DRIVE FOR PROJECTORS
Filed July 6, 1966

United States Patent Office
3,434,360
Patented Mar. 25, 1969

3,434,360
SLIDE CHANGER DRIVE FOR PROJECTORS
Reinhard Sobotta, Braunschweig, Germany, assignor to Rollei-Werke Franke & Heidecke, Braunschweig, Germany
Filed July 6, 1966, Ser. No. 563,198
Claims priority, application Germany, July 13, 1965, R 41,082
Int. Cl. F16h 29/00
U.S. Cl. 74—112    10 Claims This invention pertains to photographic apparatus. It relates to a slide projector and more particularly to a magazine type slide projector of the kind having a slide changer driven by a drive shaft that makes one revolution for each slide changing operation of the slide changer and that is generally at a standstill between each slide changing operation.

A problem which heretofore slide projectors of this kind have presented has been in getting the drive shaft to stop at substantially the same place after each slide changing operation. This problem becomes more serious as the speed of the slide changing operation is increased, because of the inertia and momentum of the various movable parts involved.

Another problem presented by such projectors has been the difficulty of limiting the slide changer drive shaft to one revolution, and thus the slide changer to one slide changing operation, when the slide change switch or lever is unintentionally in slide change position for a period of time longer than one revolution of the shaft. This problem likewise becomes more acute with an increase in the speed of the slide changing operation.

An object of this invention is to provide a generally improved and more satisfactory slide changer drive for magazine type slide projectors of the kind described.

A particular object of this invention is to provide a slide changer drive having a rotatable drive shaft that makes just one revolution for each slide changing operation and in making the one revolution, comes to a stop at substantially the same place.

Another particular object of this invention is to provide a slide changer drive having a rotatable drive shaft that does not turn at any time more than one revolution regardless of whether or not the slide change switch or lever has been actuated for a period of time longer than the period of time for one revolution of the drive shaft.

Still another object of this invention is to provide a slide changer drive with a rotatable drive shaft which has a substantially exactly defined stopping point and which does not turn at any time more than one revolution even when the rate of turning is at a high speed.

These and other desirable objects may be attained in the manner disclosed as an illustrative embodiment of the invention in the following description and in the accompanying drawing forming a part hereof, in which.

Figure 1:
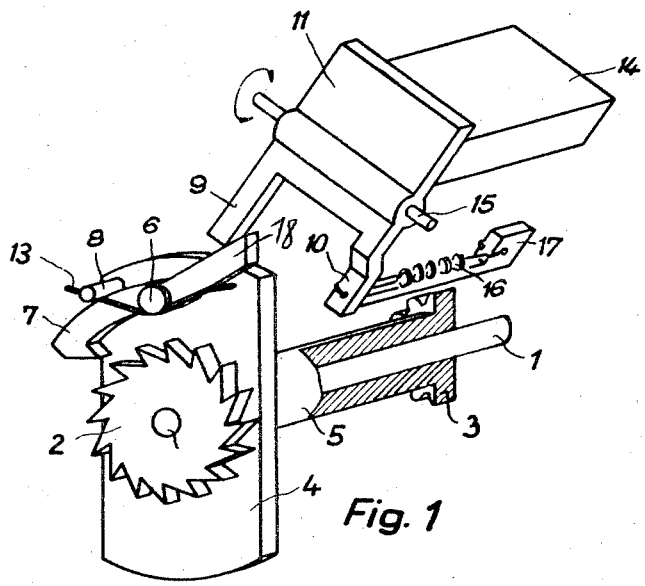
FIG. 1 is a somewhat schematic perspective view of the pertinent parts of a preferred specific embodiment of a slide changer drive of this invention with a portion of one of the parts removed to reveal underlying structure, which view shows the relative positions of these parts when the drive is in rest or standby condition.
Figure 2:
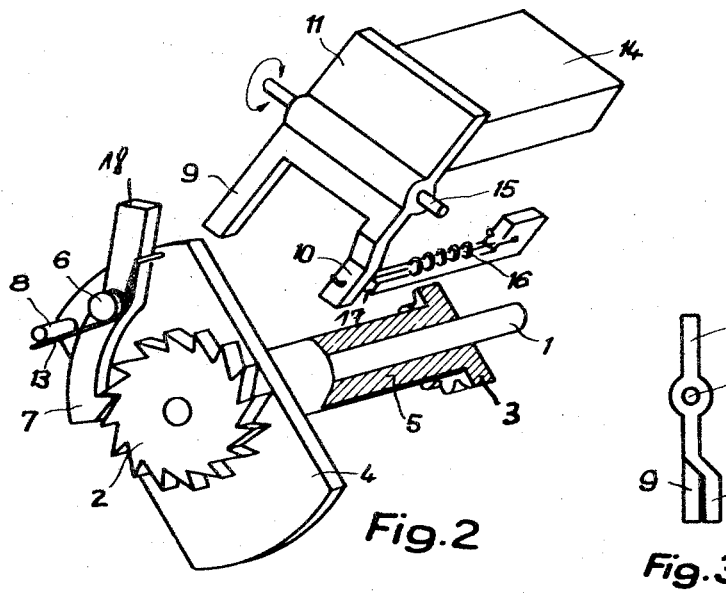
FIG. 2 is a view taken the same way as in FIG. 1, but showing the relative positions of these parts during a cycle of operation.
Figure 3:
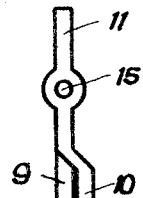
FIG. 3 is an end view of one of the parts of the specific embodiment of FIG. 1.

The specific embodiment illustrated in FIGS. 1–3 comprises a driving or power shaft 1 which, under normal operative conditions, is in constant rotation, being rotated by, for example, an electric motor (not shown). Secured to the power shaft 1 is a ratchet wheel 2.

Concentrically disposed in running fit on the power shaft 1 is the slide changer drive shaft 5. The drive shaft 5, which is a driven shaft under normal operative conditions, comprises a drive gear 3 which operates a conventional slide changer mechanism (not shown). The drive shaft 5 also comprises a flange 4 positioned adjacent the ratchet wheel 2.

Extending outwardly from the flange 4 on the side thereof facing the ratchet wheel 2 is a pivot pin 6 on which is pivotally mounted a lever, one end of which is a pawl 7. The pawl 7 is in alinement with the teeth of the ratchet wheel 2. Also carried by the pivot pin 6 is a spiral tension spring 13, one end of which bears against the lever and urges the pawl 7 toward the ratchet wheel 2, and the other end of which bears against a counter support pin 8 extending outwardly from the flange 4. The pin 8 extends outwardly sufficiently so as to limit the extent of pivotal movement of the pawl 7 away from the ratchet wheel 2. The other end of the lever arm, an extension of the pawl 7, has a pawl lever portion 18 which, in the embodiment shown, projects beyond the corresponding end of the flange 4.

When the slide changer drive is at rest or standby condition, the pawl 7 is pivoted and maintained out of engagement with the ratchet wheel 2 by means of a tooth or primary detent 9 bearing against the pawl lever portion 18. The primary detent 9 is part of a pallet or motion arrestor 11 which is hingedly mounted on a hinge pin 15 disposed on a relatively fixed axis of rotation. The motion arrestor 11 also has a second tooth or secondary detent 10 spaced from the primary detent 9. The motion arrestor 11 is positioned so that in one hinge position the primary detent 9 is in the path of travel of the pawl lever portion 18 when the pawl 7 is in engagement with the ratchet wheel 2, and in a second hinge position the primary detent 9 is out of the path of travel of the pawl lever portion 18 while the secondary detent 10 is in the path of travel at a place preferably near, but spaced from, the place in the path where the primary detent 9 would otherwise be. In one embodiment the axis of rotation of the motion arrestor 11 is generally parallel to the axis of rotation of the drive shaft 5, and the detents 9 and 10 are in alinement with each other and the path of travel of the pawl lever portion 18. In another embodiment, which is that shown, the axis of rotation of the motion arrestor 11 is in a plane generally transverse to the axis of rotation of the drive shaft 5, and the secondary detent 10 is offset (see FIG. 3) relative to the primary detent 9. In this embodiment the detents 9 and 10 are spaced by at least the dimension, parallel to the axis of rotation of the motion arrestor 11, of the pawl lever portion 18 whereat it engages the primary detent 9. The transverse dimension by which the detents 9 and 10 are offset is dependent upon the arc through which the motion arrestor 11 hingedly pivots under normal operative conditions, the transverse offset of the secondary detent 10 relative to the primary detent 9 being for the purpose of obstructing travel of the pawl lever portion 18 when the primary detent 9 is transversely out of the path of travel of the pawl lever portion 18.

Associated with the motion arrestor 11 are a spiral tension spring 16 and a relatively fixed stop 17. In the embodiment shown one end of the tension spring 16 is attached to the secondary detent 10 while the other end is secured to the stop 17. The stop 17 is positioned so that the secondary detent 10, when in normal position adjacent the path of travel of the pawl lever portion 18, abuts the stop 17, and the secondary detent 10 can only be pivoted therefrom in one direction.

Also associated with the motion arrestor 11 are means for hingedly pivoting it on its axis so that the primary detent 9 is moved out of engagement with the pawl lever portion 18 and the secondary detent 10 is placed in the path of travel of the pawl lever portion 18. In the embodiment shown these means comprise an electromagnet 14 and a portion of the motion arrestor 11, which portion functions as an armature for the electromagnet. In other embodiments these means are mechanical, comprising, for example, a crank or a lever.

The slide changer drive of FIGS. 1–3 is operated as follows.

Under normal operative conditions the power shaft 1 is in continuous rotation. Because of the spring 16, the primary detent 9 is in the path of travel of the pawl lever portion 18 and bears against it sufficiently so that the pawl 7 is pivoted against the counter support pin 8 and out of engagement with the ratchet wheel 2, in the position shown in FIG. 1. The drive shaft 5, therefore, is relatively stationary, and the slide changer drive is at rest or standby condition.

When it is desired to actuate the slide changer, the electromagnet 14 is energized, causing the motion arrestor 11 to turn on its axis, whereby the primary detent 9 moves transversely to the pawl lever portion 18 and out of contact with it. Because of the spring 13, the pawl 7 pivots into engagement with the rotating ratchet wheel 2, thereby coupling the drive shaft 5 to the power shaft 1, and the shafts rotate as a unit, as shown in FIG. 2. However, with the turning movement of the motion arrestor 11, the secondary detent 10 was swung into the path of travel of the pawl lever portion 18, and the secondary detent 10 remains in the path of travel until the electromagnet is deenergized.

If the electromagnet 14 is deenergized before the pawl lever portion 18 comes into contact with the secondary detent 10, the motion arrestor 11 is turned by the spring 16 until the secondary detent 10 abuts the stop 17. This places the primary detent 9 in the path of travel of the pawl lever portion 18. Consequently, the pawl lever portion 18 strikes the primary detent 9 and disengages the pawl 7 from the ratchet wheel 2, thereby uncoupling the two shafts. The pawl 7 pivots into contact with the counter support pin 8 and at this point further rotation of the flange 4 and drive shaft 5 is stopped with the drive shaft 5 being brought to a halt at substantially the same place as at the beginning.

On the other hand, if the electromagnet 14 remains energized long enough for the pawl lever portion 18 to strike the secondary detent 10, the momentum of the flange 4 and shaft 5 plus the bearing of the secondary detent 10 against the pawl lever portion 18 causes the pawl 7 to become disengaged from the ratchet wheel 2, and the drive shaft 5 is uncoupled from the power shaft 1. Moreover, rotation of the drive shaft 5 is stopped when the pawl 7 strikes the counter support pin 8, whereby actuation of the slide changer by the slide changer drive is stopped. Thereafter, if the electromagnet 14 is deenergized, the motion arrestor 11 is released and the secondary detent 10 is pulled by the spring 16 off the pawl lever portion 18 toward the stop 17. Under the influence of the pawl spring 13, the pawl 7 pivots into engagement with the ratchet wheel 2, coupling the power shaft 1 to the drive shaft 5, and rotation of the drive shaft 5 is resumed. However, the primary detent 9 is now in the path of travel of the pawl lever portion 18. As a result the drive shaft 5 rotates only far enough for the pawl lever portion 18 to strike the primary detent 9 and the pawl 7 to disengage from the ratchet wheel 2 and pivot into contact with the counter support pin 8, which places the drive shaft 5 at a standstill substantially at the place of beginning.

Thus, there is provided a slide changer drive having a shaft with a substantially exactly defined beginning and ultimate stopping point, and having means that prevent the shaft from making more than one revolution when the slide changer switch or lever is in its slide change position for too long a time.

A feature of advantage of the slide changer drive of this invention is that it functions as desired regardless of the speed of rotation of the power shaft 1.

Still another feature of advantage of the apparatus of this invention is that coupling of the power shaft 1 to the drive shaft 5 is unaffected by stoppage of electrical current to the projector during the slide changing operation.

Other features, advantages and specific embodiments of this invention will be readily apparent to those in the exercise of ordinary skill in the art after reading the foregoing disclosure. For example, in another specific embodiment of this invention, instead of the drive shaft being concentrically mounted in running fit on the power shaft, the two shafts are arranged end to end on substantially the same axis of rotation with the ratchet wheel at one end of the power shaft and the flange at the adjacent end of the drive shaft and positioned adjacent the ratchet wheel. In another specific embodiment the power shaft is turned only during the slide changing operation, the prime mover operatively associated therewith being actuated at the same time and by the same means as the electromagnet.

It is seen from the foregoing disclosure that the objects and purposes of the invention are well fulfilled.

What is claimed is:

1. A slide changer drive for a slide projector having a slide changing mechanism actuated by a drive shaft on an axis of rotation, which shaft makes one revolution for each cycle of operation of said mechanism, which comprises:
   (A) power shaft means comprising a power shaft on said axis of rotation;
   (B) ratchet wheel means comprising a ratchet wheel secured to said power shaft;
   (C) lever means pivotally disposed on a pivot axis generally parallel to said axis of rotation, and comprising a pawl engageable with and disengageable from said ratchet wheel;
   (D) lever support means mounted on said drive shaft and carrying said lever means;
   (E) spring means urging said pawl into engagement with said ratchel wheel; and
   (F) motion arrestor means having a first position and a second position, and comprising a primary detent which, when said motion arrestor means are in said first position, is in the path of travel of said lever means when said pawl is in engagement with said ratchet wheel for abutting said lever means and causing said pawl to pivot out of engagement with said ratchet wheel, and which, when said motion arrestor means are in said second position, is out of said path of travel.

2. Apparatus according to claim 1, wherein said lever support means comprise means limiting the extent of pivotal movement of said pawl in pivoting out of engagement with said ratchet wheel.

3. Apparatus according to claim 2, which comprises spring means that urge said motion arrestor means toward said first position, stop means that establish said positions and limit said motion arrestor means to movement to and from said positions, and means for moving said motion arrestor means from said first position to said second position.

4. Apparatus according to claim 1, wherein said motion arrestor means comprise a secondary detent which, when said motion arrestor means are in said first position, is out of said path and which, when said motion arrestor means are in said second position, is in said path, but in advance of the place in the path where said primary detent is when said motion arrestor means are in said first position.

5. Apparatus according to claim 4, which comprises spring means that urge said motion arrestor means toward said first position, stop means that establish said positions and limit said motion arrestor means to movement to and from said positions, and means for moving said motion arrestor means from said first position to said second position.

6. Apparatus according to claim 5, wherein the movement of said motion arrestor means from said first position to said second position is transversely to the path of travel of said lever means, and said secondary detent is spaced longitudinally and offset transversely from said primary detent.

7. Apparatus according to claim 6, wherein said lever support means comprise means limiting the extent of pivotal movement of said pawl in pivoting out of engagement with said ratchet wheel.

8. Apparatus according to claim 7, wherein said drive shaft is concentrically mounted in at least sliding fit on said power shaft.

9. Apparatus according to claim 8, wherein said motion arrestor means moves from said first position to said second position by pivoting on a relatively fixed axis of rotation in a plane generally transverse to said axis of rotation of said drive shaft.

10. Apparatus according to claim 9, wherein said motion arrestor means comprise an electromagnet armature portion, and said means for moving said motion arrestor means comprise an electromagnet.

References Cited

UNITED STATES PATENTS

| | | | |
|---|---|---|---|
| 2,598,448 | 5/1952 | Schultz | 74—112 |
| 2,946,227 | 7/1960 | Denton et al. | 74—1.5 |
| 3,130,594 | 4/1964 | Campbell | 74—1.5 X |

MILTON KAUFMAN, *Primary Examiner.*

U.S. Cl. X.R.

74—1.5; 88—27, 28